(12) United States Patent
Villwock (10) Patent No.: US 9,390,846 B2
(45) Date of Patent: Jul. 12, 2016

(54) MAGNETIC FLUID SUITABLE FOR HIGH SPEED AND HIGH RESOLUTION DOT-ON-DEMAND INKJET PRINTING AND METHOD OF MAKING

(76) Inventor: Thomas Villwock, San Diego, CA (US)

( * ) Notice: Subject to any disclaimer, the term of this patent is extended or adjusted under 35 U.S.C. 154(b) by 0 days.

(21) Appl. No.: 13/410,283

(22) Filed: Mar. 1, 2012

(65) Prior Publication Data

US 2012/0225264 A1 Sep. 6, 2012

Related U.S. Application Data

(60) Provisional application No. 61/447,874, filed on Mar. 1, 2011.

(51) Int. Cl.

| | |
|---|---|
| G06K 19/12 | (2006.01) |
| B42D 15/00 | (2006.01) |
| B32B 3/10 | (2006.01) |
| B41F 3/34 | (2006.01) |
| H01F 1/44 | (2006.01) |
| B82Y 30/00 | (2011.01) |
| B82Y 40/00 | (2011.01) |
| C09D 11/322 | (2014.01) |
| G06K 19/06 | (2006.01) |
| B42D 25/00 | (2014.01) |
| H01F 1/00 | (2006.01) |
| B42D 25/29 | (2014.01) |

(52) U.S. Cl.
CPC ............... *H01F 1/445* (2013.01); *B42D 25/00* (2014.10); *B82Y 30/00* (2013.01); *B82Y 40/00* (2013.01); *C09D 11/322* (2013.01); *G06K 19/06009* (2013.01); *G06K 19/06196* (2013.01); *B42D 25/29* (2014.10); *B42D 2033/16* (2013.01); *B42D 2035/08* (2013.01); *B42D 2035/34* (2013.01); *H01F 1/0054* (2013.01); *Y10T 428/24802* (2015.01); *Y10T 428/24851* (2015.01)

(58) Field of Classification Search
USPC .................. 252/62.52, 62.51 R, 62.53, 62.54; 106/31.64, 31.32
See application file for complete search history.

*Primary Examiner* — Carol M Koslow
(74) *Attorney, Agent, or Firm* — Wagenknecht IP Law Group PC (57) ABSTRACT

A magnetic fluid composition include a suspension of nanoparticles including cross-crystallized multi-metal compounds dispersed in a solvent, the cross-crystallized multi-metal compounds including at least two or more metals having different valencies or oxidation states, the metals selected from the group consisting of a monovalent metal (Me+), a divalent metal (Me2+), a trivalent metal (Me3+), a quadrivalent metal (Me4+) and a rare earth metal. The magnetic fluid having a viscosity and surface tension that permits dispensing from an inkjet printer at a rate of at least 2.5 m/s, at a resolution of at least 600 dpi, supporting jetting pulse frequencies of at least 15 KHz per nozzle (enabling high speed inkjet printing applications of at least 0.6 m/sec per individual nozzle row per print head), and enabling uninterrupted, industrial level print output of magnetic ink character recognition (MICR) code lines suitable for high speed magnetic data scanning per established industry regulations (ANSI X9).

18 Claims, 4 Drawing Sheets

MAGNETIC FLUID SUITABLE FOR HIGH SPEED AND HIGH RESOLUTION DOT-ON-DEMAND INKJET PRINTING AND METHOD OF MAKING

CROSS REFERENCE TO RELATED APPLICATIONS

This application is a nonprovisional application claiming priority to U.S. provisional patent application Ser. No. 61/447,874 filed Mar. 1, 2011.

TECHNICAL FIELD

The invention relates to fluids having magnetic properties for use with inkjet printing and more specifically to nanoparticle fluids suitable for high speed and high resolution dot-on-demand inkjet printing, their use for printing magnetizable characters and methods of manufacturing.

BACKGROUND OF THE INVENTION

Inkjet printers are used to reproduce digital images on substrates by delivering variably sized droplets of fluid, such as inks. These fluids generally include a dye or pigment to form the desired color palette together with one or more solvents, whether aqueous or non-aqueous. In addition, they often include additional additives depending on desired properties. Among these include various surfactants, humectants, biocides, dispersion aids and the like.

Among the recent adaptations of inkjet printing is its use in the production of security documents, such as checks. To this end, fluids have been supplemented with various additives to provide magnetizable properties. Typically, these magnetizable fluids include iron oxide and are printed in special typefaces. The print is read by magnetizing the characters then passing them over a read head, which detects and interprets particular waveforms. This process is referred to as Magnetic Ink Character Recognition (MICR). Among the benefits of MICR is that it permits reliable reading of characters even when overprinted with stamps or other nonmagnetic inks. Thus, MICR provides an encouraging approach for securing documents.

The widespread adoption of MICR has led to increased demand for improved magnetizable fluids; however, there remain significant challenges in their development. Among these include challenges of increasing print speed, resolution and shelf life. For instance, large magnetizable particles tend to retain their imparted charge over longer lengths of time and thus have a longer shelf life compared to smaller particles; however, solutions containing large particles tend to settle, slow printing speeds and decrease resolution. Accordingly, there remains a need to develop new magnetizable fluids for use with inkjet printing that balance increased shelf life with increased print resolution and print speed.

BRIEF SUMMARY OF THE INVENTION

The invention addresses the need to provide magnetic fluids for inkjet applications, which have improved print speed and resolution characteristics while providing long term shelf life. This is accomplished by providing nanoparticle fluids for use with ink jet printing on substrates for magnetic reading. The nanoparticle fluid includes a suspension of nanoparticles including densely packed composites of multi-metal compounds formed by nanosintering the multi-metal compounds, which are then dispersed in a solvent, wherein the composites of multi-metal compounds include at least two or more metals, which may be the same or different but have a different valence or oxidation state. Specifically, the metals are selected from the group consisting of a monovalent metal (Me+), a divalent metal (Me2+), a trivalent metal (Me3+), a quadrivalent metal (Me4+) and a rare earth metal. The nanoparticle fluids have a viscosity less than 15 cp and surface tension of about 20-30 dynes. The nanoparticle fluid properties permit dispensing from an inkjet printer at a rate of at least 2.5 m/s and at a resolution of at least 600 dpi; however, a resolution of 2400 dpi has been achieved. The fluids may also include at least one biocide, surfactant or at least one substrate conditioner and optionally a co-solvent, polymeric binder, synergist, colorant, dye, pigment or hybrid thereof. Preferably, the fluids include a shelf life of at least 12 months by resisting separation by a magnetic field or gravitational force. Preferably, the solvent includes at least 50% by volume an aqueous solvent or a non-aqueous solvent.

The nanoparticles are tightly packed and may include at least two metal oxide segments within a same nanoparticle spaced about 1 nm to about 7 nm. In some embodiments the metal oxides include a FeIII oxide, a MnII oxide and an oxide of a divalent metal cation including a metal selected from the group consisting of Fe, Ni, Mn, Co, Cu, Pt, Au, Ag, Ba and a rare earth metal. At least one metal oxide may include FeIII or MnII.

The fluid may be used for inkjet printing, such as using a dot-on-demand process. In some embodiments the fluid is inkjet printed on a paper substrate, which can be porous or non-porous, coated or non-coated. In some embodiments an applied per print pass density is at least 3.5 mg/inch$^2$. In some embodiments the fluid may be printed on a paper substrate at a print density of 5 µL/inch$^2$ and at a black optical density of at least 90 as measured using the TAPPI METHOD OD 1213.

The fluid may be stabilized with acidic surface agents or surfactants, such as those selected from the group consisting of C5-12 and C17-24 multi-hydroxy-multi carbonic acids and a co-solvent selected from the group consisting of polyethylene glycol (PEG), glycerine, ethylene glycol, a hydroxyl-(poly)ether, a hydroxyl-(poly)ketone, and a hydroxyl-(poly)aldehyde. The fluid may include UV curable monomers or oligomers, a photoinitiator, a synergist, a biocide, a substrate conditioner, and/or other additives. In a related aspect, a nanoparticle for use in the fluid is provided, which includes a plurality of metal oxides having in at least two different oxidation states, which are selected from the group consisting of a monovalent metal (Me+), a divalent metal (Me2+), a trivalent metal (Me3+), and a quadrivalent metal (Me4+); wherein the distance between any two neighboring metals across each sub-segment boundary within the nanoparticle is from about 1 nm to about 15 nm, and wherein the nanoparticle has a size of 10-60 nm.

In another aspect of the invention a document having a security feature is provided, the document including the fluid according to the invention deposited thereon. In some embodiments the fluid is printed between at least two layers of a multi-layer substrate, optionally wherein surrounding layers are opaque and conceal the fluid. Detection of the fluid or reading data encoded by the fluid can be performed by magnetization and subsequent magnetic scanning to detect the magnetic waveform present and decode the waveform into its corresponding data. Exemplary documents include certificates, currency, checks, tickets and stamps.

In a related aspect a machine readable mark used as a security feature for an object is provided, the mark including the fluid printed on the object and optionally covered by an opaque covering. Exemplary objects include a variety of commercial goods such as electronic devices and their packaging, which includes an inkjet cartridge, a laser printer cartridge, a rotating data carrier, a non-rotating data carrier, a memory chip, a compact disk a DVD jewel and the like. Objects may also include a variety of household items, articles of clothing or the like. The machine readable mark may be printed in a configuration such as a 1-dimensional barcode, a 2-dimensional bar code, a PDF417 barcode, a datamatrix barcode, in a E13B format and in a CMC7 format or the like. Further, the fluid may be covered with an opaque covering to discourage tampering, which may include an ink, a dye, a pigment, colored fluid, overcoat varnish or the like to mask or hide the mark.

In another related aspect, use of the fluid in an offset printing method is provided, which includes providing the fluid coupled to a printer, and printing indicia or a pattern on a paper, plastic or other substrate using an offset printing process.

In another related aspect, a method of manufacturing the fluid is provided, which includes: forming at least two different metal oxides from the at least two metals having different valencies or oxidation states; precipitating the at least two different metal oxides together to form a precipitate mixture; nanosintering the precipitate mixture to form nanoparticles; adding an agglomeration stabilizer and adjusting the surface tension of the magnetic fluid suitable for use with inkjet printing. The method may also include a consolidation step prior to the cross-crystallization step. Still further the methods may include adding one or more co-solvents and surfactants or surface active agents after nanosintering and optionally one or more colorants, dyes, pigments or hybrids thereof.

BRIEF DESCRIPTION OF THE DRAWINGS

FIG. 3 is a schematic showing a final process of mixing all three predicated metal oxides (individual and mixed metals) with additional reactant products to form a densely packed nanosintered magnetic nanoparticle 10-60 nm. A.) The mixed metal acid consolidated precipitate solution (from FIG. 2) is washed and centrifuged and then added to a reaction pot with various reaction reagents, including more consolidation agents and individual metal precipitates. B.) The reaction solution is ejected down a heated rod into a pressure reactor chamber under distinct conditions. C.) Intimate particle proximity, under crystal growth conditions causes particle formation. The cross crystallized particles are flash interrupted by LN, washed, and then coated with surface stabilizers or other surface active agents and are now ready for combination with other ink components for a final ink formulation.

DETAILED DESCRIPTION OF THE INVENTION

To assist the reader in understanding the terms used in the description the following provides a brief description of terms commonly referenced.

The term "cross-crystallized" as used herein refers to the joining of two different crystalline structures. Cross-crystallization involves the joining of at least two metal oxides, which differ in oxidation number. Cross-crystallization is performed by nanosintering the at least two metal oxides to form a nanoparticle.

The tem "oxidation number" or "oxidation state" as used herein refers to oxidation state as known in the chemical arts, namely, the hypothetical charge that an atom would have if all bonds to the atom of were 100% ionic.

The term "metal element" as used herein refers to any metal listed on the periodic table. A "metal element" can have more than one oxidation state.

The terms "multi-metal compound", "metal alloy", and "metal composite" as used herein refer to a compound or material formed by a plurality of metals, where at least two metals differ in oxidation state from one another and are bonded together. A multi-metal compound also encompasses metal oxides having metals with different oxidation states joined together.

The term "metal oxide" as used herein refers to a crystalline solid that contains a metal cation and an oxide anion. A "metal oxide" encompasses all metal oxides, including any monoxides, dioxides, trioxides, tetroxides, and pentoxides.

The term "intra-particle segment" as used herein refers to the average distance between two neighboring metals having a different oxidation state.

The term "neighboring metals" as used herein refers to two metal elements that are not separated by another metal element.

The term "rare earth metal" as used herein refers to the group of fifteen lanthanides plus scandium and yttrium found on the periodic table.

The term "per print pass density" as used herein refers to the density of fluid printed on a substrate in a single pass of an inkjet printer from a single nozzle.

As an introduction to the invention, a fluid suitable for printing characters for magnetic recognition having properties which permit high speed and high resolution printing is provided. The fluid is useful in the production of security features for substrates, such as documents or objects. The fluid is also useful in the production of indicia used in tracking commercial products or in inventory control. It is an object of the invention to provide a fluid that can be printed at high speeds and at high resolution. It is a further object of the invention to provide a fluid having an extended shelf life. These objects are accomplished through the development of a fluid having a suspension of nanoparticles formed from densely packed multi-metal compounds provided in at least two different oxidation states.

It has been surprisingly found that compared to conventional fluids for magnetic character recognition, the fluids herein have achieved inkjet drop formation on a substrate at speeds of 10 m/sec and higher through small diameter inkjet nozzles of 10 microns or less with shear rates of about 100,000 $s^{-1}$. This permits surprisingly high speed jetting at high resolution of magnetizable particles. This is further surprising in view of the extended shelf life of the fluid, which is greater than 12 months. A variety of parameters have been tested experimentally. It has also been found that compared to current state of the art MICR ink formulations, implementations favor this new invention in terms of uninterrupted duty cycle (e.g. Old vs. New: 10 times improvement), achievable print resolution (e.g. Old: 300≤600 vs. New: up to 2400 dpi), drop eject frequency (e.g. Old: 12.5 KHz vs. New: 40 KHz), drop size (e.g. Old: >20 pl vs. New: >2 pl), permissible nozzle diameter (e.g. Old: >50 μM vs. New: >7 μM).

The fluid may be printed using a variety of inkjet printers and may be printed on a variety of substrates depending on the needs of the user. As nonlimiting examples the fluids may be applied using a drop on demand system such as a variety of bubble jet printers, piezoelectric printers and the like. As such, the fluid may be stored in any delivery container suitable for use with the desired printer. The invention is particularly useful for printing security features associated with documents, certificates, currency and checks. It is also useful for security features associated with tickets and stamps. Commercially, vendors will use the fluids for security of their commercial products or goods such as by printing the fluid directly on the product or on a substrate associated with the product, such as a product box, sticker, label, tag or the like. Exemplary products include electronic devices such as televisions, telephones, stereo components, computers, electronic accessories such as monitors, printers, inkjet cartridges, laser printer cartridges, rotating data carriers, non-rotating data carriers, memory chips, compact disks, DVD jewels and the like. In addition, goods may include clothing or clothing accessories, jewelry and the like. In some instances, the magnetic fluid is printed on products that require the purchaser to be over a legal age, such as on alcohol containers, tobacco products or the like. Since the fluid itself is magnetizable, markings or indicia formed by the fluid discourage tampering such as intentionally altering indicia with fluids that are not magnetizable. Further, the fluid allows vendors or users to write or stamp over the printed indicia without concern of masking the data encoded by the fluid. For instance, a marking or indicia printed with a fluid can be covered by an opaque covering, such as but not limited to an ink or a non-magnetic substrate.

Preferably, the fluid includes a shelf life of at least 12 months by resisting separation from a magnetic field or gravitational force. In some embodiments the fluid has a shelf life of over 18 months. In some embodiments the fluid has a shelf life of over 24 months. In some embodiments the fluid has a shelf life of three years or more. Shelf life can be determined by calculating a change in density to assess whether the nanoparticles have settled from solution. This can be accomplished by measuring the density of the fluid at top and bottom portions of a stored fluid at any given time point, subtracting the density of the top from the density of the bottom, dividing the result by the average density of the fluid as a whole and multiplying the amount by 100%. As guidance, an exemplary threshold for determining suitable shelf life is a difference in density between top and bottom that is within 30% of the average fluid density; however, a magnetic fluid is more preferred if the value is between 20%-25% and is still more preferred if the value is less than 20%, and is most preferred if the value is less than 10%.

While the fluid can be printed in any desired configuration, configurations of particular interest may include a 1-dimensional barcode, a 2-dimensional bar code, a PDF417 barcode, a datamatrix barcode, a E13B format and a CMC7 format. In other embodiments, the fluid is printed between layers of a substrate. The fluid may also be combined with other security features. For example, when printed together with other security based fluids, such as ultraviolet detectable fluids or printing techniques, such as nonlinear or random printing of data strings, security of a substrate or document can be enhanced. As an example, the fluid can be used in the production of a secured check, where the magnetic properties are positioned in multiple locations and in a nonlinear format and where additional data is printed in a UV excitable fluid.

I. Nanoparticle Fluids

The fluid itself includes a suspension of nanoparticles, which includes multi-metal compounds densely packed by nanosintering and dispersed in a solvent. The fluid becomes magnetized in the presence of a magnetic field. The multi-metal compounds within the nanoparticle include at least two or more metals having different valencies or oxidation states, each of which is selected from a monovalent metal (Me+), a divalent metal (Me2+), a trivalent metal (Me3+), a quadrivalent metal (Me4+) and a rare earth metal. In some embodiments the metal is a same metal element having a different oxidation state; however, in preferred embodiments the two metals are both different metal elements and have different oxidation states. In some embodiments three metals having different oxidation states are used, optionally each being a different metal element. In still further embodiments four metals having different oxidation states are used, optionally each being a different metal element.

The nanoparticle fluid has a viscosity and surface tension that permits dispensing from an inkjet printer at a rate of 2.5 m/s and at a resolution of at least 600 dpi. More preferably the inks are printed at a resolution of 1200 dpi to about 2400 dpi. This is accomplished through the small but dense nanoparticle configuration.

Preferably, metal oxides provide the fluid with its magnetic properties. Exemplary metal oxides that can be used include a FeIII oxide, a MnII oxide and an oxide of a divalent metal cation that itself includes or is derived from a metal selected from the group consisting of Fe, Ni, Mn, Co, Cu, Pt, Au, Ag, Ba and a rare earth metal. Nanosintering_results in the joining of the at least two metals having different oxidation states to one another to form nanoparticles suitable for use as in the nanoparticle fluid. Metal oxides are preferably provided in equal or about equal amounts for forming the nanoparticle thereby resulting in an approximately equal ratio of metal oxides within the nanoparticles; however, the skilled artisan will appreciate that their distribution within the nanoparticle may vary. In other embodiments the ratio between metal oxides varies within the nanoparticles. Additional guidance is provided by the following general formula: Me1(alpha1)a1Me2(alpha2)a2 . . . Men(alphan)an-ON where SUM[(alphai)*ai]=2N, with alphai is element of $\{1,2,3,4\}$, ai is element of Q>0 and Mei is element of the group of metals described above and O is Oxygen and N is an integer >0. Variations can be achieved by cross-crystallizing different ratios of metal oxide populations. Typically nanosintering results in a segment of about 1 mm to about 7 mm between neighboring metals with different oxidation states; however, in preferred embodiments the average segment between neighboring metals having different oxidation states is from about 1 nm to about 7 nm. By densely packing the particles, increased loads for magnetization may be added during each printing pass along a substrate or document within a given volume. The result is an applied per print pass density of at least 3.5 mg/inch$^2$. When testing on a paper substrate the nanoparticle fluid demonstrated a consistent print density of 5 μL/inch$^2$ and a black optical density of at least 90 as measured using the TAPPI METHOD OD 1213 and a densitometer. A density according to the TAPPI METHOD OD 1213 is the optical-negative logarithm to base 10 of transmittance for transparent material or the reflectance for an opaque material and has the equation Optical Density=log 10 1/R, where R is reflectance. The surface tension of the nanoparticle fluid is generally about 30-40 dynes and the viscosity is generally between about 2 cp and 8 cp.

The formed nanoparticles may be stored or suspended in a variety of solvents depending on the desired use. For instance, the nanoparticles can be suspended in a solvent including at least 50% by volume of an aqueous solvent or a non-aqueous solvent. The term "solvent" within the context of the invention refers to aqueous or non-aqueous and organic or inorganic solvents. Examples of solvents that may be used with the invention include water, isopropanol, tetrahydrofuran (THF), acetone, hexane, petroleum, epoxy and the like. The solvent may be chosen in part depending on the desired substrate as known in the inkjet arts.

When using the nanoparticle fluids in inkjet processes consideration must be given to the fluid viscosity. A viscosity that is too high tends to the clog the jets or tends to bead on the surface causing an uneven printing. A viscosity that is too low tends to be "runny" when dispensed and reduces the control over the high resolution positioning of colors or images. Accordingly, when using drop-on-demand type printers such as bubble jet printers and piezoelectric printers, the preferred viscosity is less than about 15 centipoise (cp). More preferably the viscosity is about 2-8 cp. The viscosity can be adjusted by thickeners, dispersants and the like. For example, thickeners tend to increase the viscosity thereby thickening the fluid. Dispersants however promote the distribution and separation of fine or extremely fine solid particles. Accordingly, dispersants may assist in uniformly distributing the magnetic particles throughout the fluid thereby preventing the fluid from settling. Settling can be determined by measuring the density of the magnetic fluid and determining whether or to what extent the density differs from bottom to top in a given magnetic fluid sample. Dispersants are typically provided between about 1% and 10%. Dispersants are generally formed from a surfactant and solvent. Generally the solvent carries the surfactant into the solution and the surfactant reduces the surface tension and prevents agglomeration, such as in response to Van der Waals forces and magnetic forces. Thus, a nanoparticle fluid having a higher capacity to impart a magnetic force may require more surfactant than a conventional inkjet fluid. While a variety of surfactants may be used, in preferred embodiments, the preferred surfactant includes a mixture of molecules that have about 5-12 carbons and about 17-24 carbons. Each of molecules preferably has two or more hydroxyl groups and at least one carbonic acid moiety. While amounts can vary surfactants are generally provided in an amount from about 0.1% to about 8%. Greater amounts of surfactants tend to reduce surface tension and thus increase wetting. The particular amount of surfactant may vary depending on the particular nano-particles or the substrate used for printing.

In addition, a variety of additives may be provided, including but not limited to one or more biocides, humectants or drying control additives, synergists, substrate conditioners or wetting additives, colorants or surface appearance additives, pigments, other metallic or nonmetallic nanoparticles, dyes, polymer additives, anti-settling additives, dispersants, foam control, adhesion promotion additives, rheology control additives and the like as known in the inkjet arts. In some embodiments ultra violet curable monomers or oligomers and initiators are provided in the magnetic fluid, which upon exposure to a UV light source forms a solid polymer.

Biocides and fungicides are chemical substances or compounds capable of killing living organisms. As such, their inclusion may prevent growth or attachment of living organisms to the fluid thereby increasing its lifespan. Biocides and fungicides may be synthetic or natural and may themselves have short or long half lives. A variety of biocides and fungicides are known in the inkjet arts and thus their inclusion and relative amounts may be determined by the ordinarily skilled artisan. While amounts can vary, generally biocides and fungicides form about 0.01% to about 1% of the fluid. In some embodiments biocides also provide surfactant or humectant properties.

Humectants are compounds that reduce evaporation and are often provided as a co-solvent together with a dispersant. Accordingly, humectants assist in retaining a consistent concentration of particles throughout the shelf life of the fluid. An exemplary humectant is ethylene glycol. Examples of preferred co-solvents include ethylene glycol, polyethylene glycol (PEG), glycerine, hydroxyl-(poly)ether, hydroxyl-(poly) ketone, a hydroxyl-(poly)aldehyde and the like. As a nonlimiting example, humectants are usually provided between 0% and less than 1%; however, greater amounts such as about 5%, 10%, 15% and 20% are also encompassed by the invention.

The nanoparticle fluid may also include UV curable monomers or oligomers, a photo initiator a substrate conditioner and the like. Accordingly, UV curable monomers or oligomers may undergo a polymerization reaction to polymerize the fluid composition along the substrate, which decrease drying time. A variety of polymers are known in the art such as acrylates, including methacrylates, hydroxyethyl methacrylate, and the like. Further, hydrophobic polymers are polymers that do not absorb an appreciable amount of an aqueous solution; whereas hydrophilic polymers do tend to absorb an appreciable amount of aqueous solution. UV curing is generally accomplished by applying a UV source to a photo initiator, which begins the polymerization reaction. In an exemplary method of use, the magnetic fluid including UV curable monomers or oligomers are applied to a substrate, such as using an inkjet printer. The nanoparticle fluid is cured by applying a UV source to initiate radical formation and thus polymerization. UV light sources can be coupled directly to an ink jet printer or may be provided separately. In another approach the nanoparticle fluid incorporates oxidative polymerization to assist in drying of the fluid. In oxidative polymerization oxygen from the air adds to double bonds within the fluid to form hydroperoxides. Like UV induced polymerization, the resulting free radicals attack other molecules and form new larger free radicals. This causes polymerization of the fluid. Whether a UV curable approach is used or oxidative polymerization or cationic polymerization, adding monomers or oligomers that can undergo polymerization to the magnetic fluid can reduce drying time of the magnetic fluid.

Colorants may also be added to change or enhance the coloring of the nanoparticle fluid. One skilled in the art will appreciate that a variety of approaches are used to impart color, which include the use of colorants, dyes, pigments, and hybrids thereof. Accordingly, the term "colorant" as used herein can also refer to dyes, pigments, hybrids thereof and the like. Dyes are generally applied in an aqueous fluid and typically have an affinity for the substrate; whereas, pigments are generally insoluble and do not have affinity for the substrate. While dyes may be used, generally pigments are preferred. Each can be used as desired by the user and as consistent with the particular formulation. Colorants are generally provided in an amount of about 1% to 15% although they may be used in higher amounts such as 20%, 25%, 30% or more.

A sample of a typical water-based inkjet ink is shown in Table 1 below:

TABLE 1

| Component | Composition | Purpose |
| --- | --- | --- |
| Water | 50-90% | Solvent, carrier fluid |
| Colorants - Dyes and Pigments | 0-10% | Add vibrancy |
| Co-solvents | 5-50% | Humectants, enhance ink formation on paper |
| Surfactants | 0-5% | Improve wetting and flow through nozzle |
| Polymeric binders | 0-10% | Increase durability and appearance of print |
| Other additives: biocides | 0-1% | Prevent bacteria growth |

II. Uses for Nanoparticle Fluids

While the nanoparticle fluid can be used for printing on nearly any substrate, the invention is particularly useful for printing security features associated with documents, certificates, currency, checks, commercial products and the like. In some embodiments, the nanoparticle fluid is used as a means for magnetic ink character recognition, such for printing MICR lines on checks. In such embodiments the nanoparticle fluid is printed on a check such that when the check moves across a magnetic head the magnetic head detects the flux of magnetic signal and when combined with the elapsed read time, obtains a characteristic curve in accordance with the change in magnetic flux. While the MICR approach in general is known in the art; the nanoparticle fluid of the present invention has a higher capacity to retain magnetic forces yet provides smaller magnetizable particles, which facilitates improved resolution, a higher signal to area ratio, higher speed printing and higher speed of recognition. Still further, while conventional MICR lines are printed along the bottom of the check and in linear format, the nanoparticle fluid may be printed in other locations and in other configurations.

In some embodiments the fluid is printed directly on a commercial product such as directly on a device itself or its packaging. Thus, uses of the nanoparticle fluid expand beyond banking uses and extend into product security, inventory control and the like through the incorporation of the nanoparticle fluid together with a magnetic reader.

While the nanoparticle fluid may be used alone, in other embodiments the nanoparticle fluid is used together with a second fluid, such as nomagnetizable ink, which in some instances is applied over the nanoparticle fluid to hide or visually mask magnetic features or to impart color to indicia printed in nanoparticle fluid to enhance its visibility or identification. Accordingly, in a related aspect of the invention, a substrate having the nanoparticle fluid printed thereon is provided, which optionally also includes a second fluid such as a colored non-magnetizable fluid also printed thereon. In other embodiments the nanoparticle fluid is provided together with additional security fluids, such as UV excitable fluids that are exposed by the application of a UV source, IR excitable fluids that are exposed by the application of a IR source, colored fluids in non-linear formats, such as random non-linear printing of security data and the like.

The nanoparticle fluids can be printed using an inkjet printer. One skilled in the art will appreciate that the nanoparticle fluid can be provided in a suitable housing, such as a print cartridge as dictated by the printer. Similarly, one skilled in the art will appreciate that the nanoparticle fluid can be printed in a variety of formats or configurations through the use of suitable print software. For example, nanoparticle fluid can be used to print a mark such as a 1-dimensional barcode, a 2-dimensional bar code, a PDF417 barcode, a datamatrix barcode, indicia in E13B format, CMC7 format or the like. Alternatively, the user can generate an image using suitable image drawing software and print the image using the magnetic fluid. Such technologies generally involve generating one or more bitmaps. For example, in some approaches a bitmap is generated for printing the nanoparticle fluid and a second bitmap is generated for printing a non-magnetizable fluid. Examples of non-magnetizable fluids include a variety of fluids generally referred to as inks that include colorants, pigments, dyes or a mixture thereof to provide visible indicia. Although the skilled artisan will appreciate that the magnetic fluid itself may also include one or more colorant, pigment, dye or mixture thereof. In any event, one skilled in the art will recognize that printing the nanoparticle fluid on a substrate results in a magnetically readable mark, which can be detected by a suitable magnetic reader. Generally such magnetic readers are coupled to a computer to interpret the magnetically encoded data such as converting magnetic waveforms into corresponding data.

While the nanoparticle fluid can be printed directly on a substrate or on top of a layered substrate, in some embodiments the nanoparticle fluid is layered between at least two layers of a substrate since the magnetic properties in some embodiments are detectable through the substrate. In further embodiments, the substrate includes three or more layers with the nanoparticle fluid printed between two or more of the layers. While the substrate can be transparent or semi-transparent often the substrate will be opaque such that the boundaries of the nanoparticle fluid are not visually identifiable, which provides added security. In some instances the substrate is a multi-layer laminate. In such instances, inkjet printing using the nanoparticle fluid can be performed during the lamination process. Accordingly, markings may be printed between layers, which associate the particular laminate with its corresponding characteristics, identification or other usable data as needed by the user. While useful for securing documents and the like, the nanoparticle fluid or a fluid containing the densely packed nanoparticles_may also be adapted for biomedical applications. For example, densely packed nanoparticles that are biocompatible and non-toxic may be used in vivo as contrast agents in magnetic resonance imaging (MRI), labeling of tissues or cells, such as cancerous tissues, magnetic control of transport of therapeutics, thermotherapy and the like. The nanoparticle fluid may also be used ex vivo or in vitro to detect or measure interactions between molecules, such as through coupling the densely packed nanoparticles to compounds, polypeptides and the like followed by assays such as binding assays known in the chemical and biochemical arts.

Nanoparticle fluids suitable for use in MM include the densely packed nanoparticles formed from metals provided in two different oxidation states that are suspended in a suitable solvent or media. The skilled artisan will appreciate that depending on the intended use or route of administration, the formulation may deviate from the formulations used in ink jet printing. For example, MRI contrasting agents would not generally incorporate colorants, dyes or the like and may be provided at a biological pH, use biocompatible solvents and the like as known in the MRI field. When coupling the densely packed nanoparticle to compounds, such as to antibodies for targeting a particular protein or cell type, such as a cancer cell in a heat treatment, the particle can be adapted with reactive groups that facilitate protein or nucleic acid conjugation.

III. Methods of Manufacturing Nanoparticle Fluids

In a related aspect of the invention, a method of manufacturing a nanoparticle fluid is provided. The method includes i. providing at least two metals having different valencies or oxidation states as three samples, wherein a first sample includes the first metal, a second sample includes the second metal and a third sample includes both the first and second metal, such as an consolidated alloy; ii. forming metal hydroxides from the metals in each of the samples; iii. combining the three samples to form a mixture of different metal hydroxides; iv. nanosintering the mixture of metal hydroxides to form densely packed composite nanoparticles; and v. coating nanoparticles with low molecular weight hydroxyl carbonic acids to act as agglomeration stabilizers.

In preferred embodiments, metals used in the manufacturing of the nanoparticle fluid have different valencies or different oxidation states. Most preferably, the two or three metals are selected from two of the group consisting of a monovalent metal (Me+), a divalent metal (Me2+), a trivalent metal (Me3+), a quadrivalent metal (Me4+) and a rare earth metal. Rare earth metals are generally in a 3+ oxidation state; however, europium also has a valence of 2+ and cerium also has a valence of 4+. Nonetheless, at least one and up to four metals having two different valencies or oxidation states are selected, which may be from different metal elements having different oxidation states or same metal elements having different oxidation states. Metals are generally added to an aqueous solvent in the form of a salt (chlorides, sulfates, nitrates, etc.), to begin the transformation into cross-crystallized nanoparticles. Possible metal combinations and general stoichiometric formulations for cross-crystallized magnetic nanoparticles are as follows:

a.) Fe(III), Fe(II), Mn(II)→Fe(III)$_2$Fe(II)$_{0.5}$Mn$_{0.5}$O$_4$
b.) Fe(III), Fe(II), Co(II)→Fe(III)$_2$Fe(II)$_{0.3}$Co$_{0.7}$O$_4$
c.) Ni(II), Fe(III), Co(II)→Fe$_2$Ni$_{0.3}$Co$_{0.7}$O$_4$
d.) Ni(II), Fe(III), Mn(II)→Fe$_2$Ni$_{0.3}$Mn$_{0.7}$O$_4$
e.) General:
(Me(III)$_2$Me(II)$_{1-b}$Me(II)$_b$)O$_4$
(Me(I)Me(II)$_{1-b}$(MeIII)$_{1-(2/3b)}$(MeIV)$_2$)O$_5$ Initially, metals can be precipitated into metal hydroxide precipitates by hydroxide displacement of a corresponding acidic inorganic anion of the metal salt, which is later followed by rapid dehydration to form a Me oxide. In the preferred embodiments at least three metal hydroxide solutions are precipitated including at least two individual metal hydroxides and one combined metal hydroxide solution (i.e. Fe$_2$O$_3$, MnO, and Fe$_2$MnO$_4$). The first precipitation of the at least two individual metal hydroxides results in 1-3 nm metal crystallites which are combined and precipitated again to form the third hydroxide solution with 7-15 nm nanoparticles. In preferred embodiments precipitation is interrupted by flash freezing with a cryogenic fluid once the precipitation reaction results in particles of about 7-15 nm. Determining or confirming particle size can be conducted using a variety of methods, such as various filtration techniques to exclude particles that are too large, milling to ensure the particles are not too large or the like. Preferably milling is avoided. A series of centrifugation steps can also be used to separate different sized particles. Characterization techniques such as transmission electron microscopy (TEM) or high resolution scanning electron microscopy (SEM) can also provide images to determine size. Zetasizers or other particle size analyzers can also be utilized for achieving particle size distributions, etc. After the precipitation interruption at the desired size, the three solution samples (two individual metal hydroxide solutions (1-3 nm crystallites) and a collective metal hydroxide solution (7-15 nm particles) can be combined by acid consolidation to form a compiled mixture of precipitated metal hydroxides for downstream additional precipitation reactions and eventually cross-crystallization. In the preferred embodiments, the optional step of acid consolidation is based on acid surface active agents which assist in providing a short-range force on the particles for bringing them closer to one another. Ultimately, the acid consolidation aids in densification of the particles.

A final mixture of precipitated metal oxides is then nanosintered to form an ultimate nanoparticle (10-60 nm) consisting of both metals. In the preferred embodiments, nanosintering is initiated by ejecting at least three precipitated fluids simultaneously towards a heating rod heated to 40-90 degrees C. The fluid is collected in a chamber where the cross-crystallized nanoparticles undergo a low pressure (<100 MPa) sintering stage with temperatures between 80-120 degree C. It should be noted that higher pressures (up to 1 GPa) can also be used achieving the desired nanosintered atomic structure. Ultrasound frequencies around 60 kW/m3 together with an induced magnetic field (created by permanent magnets near the reaction chamber) assist in densification during the cross-crystallization process. Preferably, nanosintering results in highly dense nanoparticles such that magnetizable properties of the resulting fluid may be prolonged thereby increasing its shelf life while also increasing the magnetic capacity of the particles. In preferred embodiments the distance between neighboring metals that have different oxidation states, which is also referred to as the intra particle segment is about 1 nm to about 15 nm and preferably an overall particle size is about 10-60 nm. Achieving unexpectedly dense particles of such small size is achieved by the cross-crystallization approach. Specifically, cross-crystallization can be enhanced by altering the pH of the solution in a range between 10-14, increasing the temperature of the solution to over 40° C., more preferably to about 120° C., applying ultrasound at a frequency above 20 KHz (greater than 60 KW/m$^3$), and reducing the spatial distribution of the precipitate by applying a magnetic field of 0.1-1 T, preferably 0.5 T to the particles during the cross-crystallization process. In some cases, the magnetic field is realized by placing two permanent magnets of 40 kGauss at the bottom and 10 kGauss at the top of the reaction chamber. The magnetic field affects the nanoparticles and influences the transport through the media during the nanosintering process. Any such method to polarize the electron clouds and create electron shells in the media could be utilized during nanosintering to influence the nanoparticles. Furthermore, nanosintering is a result of anisotropic advanced crystal growth under confined conditions.

Figure 1:
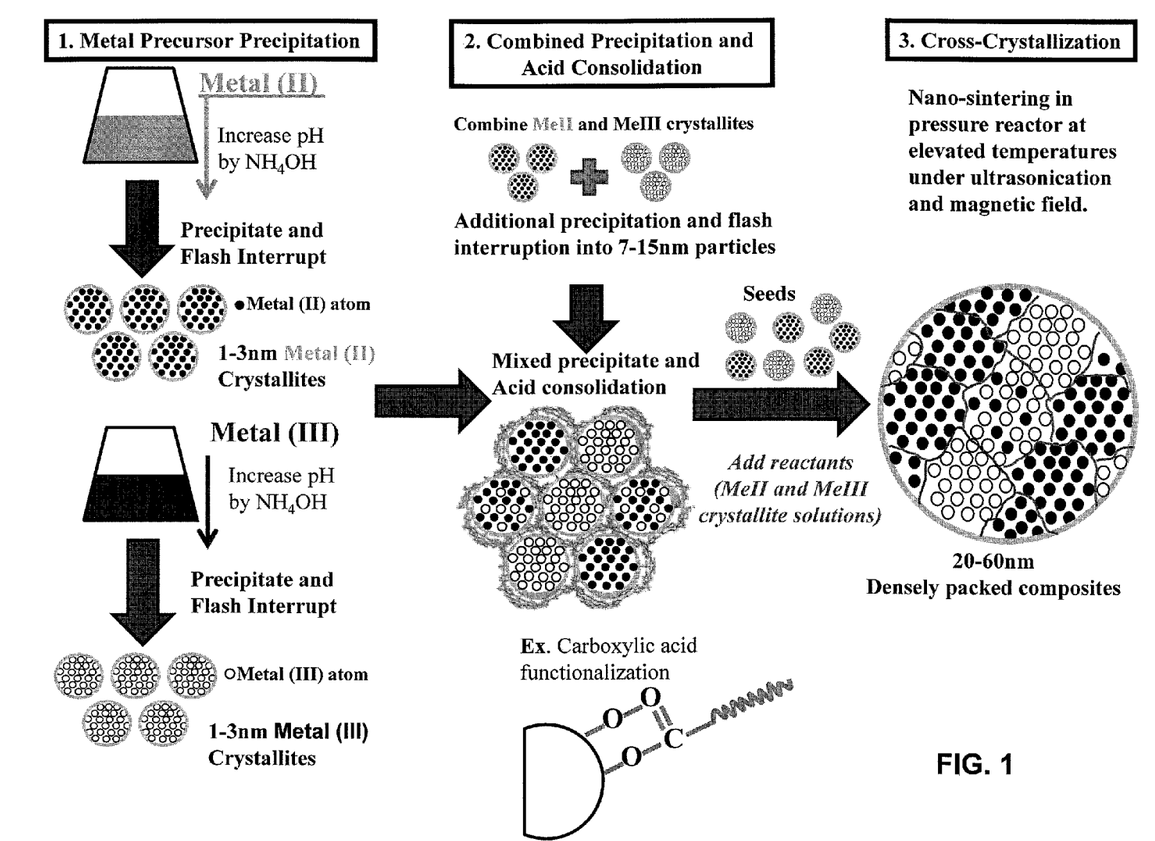
FIG. 1 is a schematic overview of the invention where 1.) Metal oxides are precipitated alone in part, followed by 2.) combined precipitation and acid assisted consolidation and finally 3.) cross-crystallization in the form of "nanosintering" of all precipitated solutions to form a densely packed magnetic nanoparticle metal composite.

FIG. 1 reveals a schematic overview of the invention where 1.) Metal precursors produce metal crystallites 1-3 nm in diameter 2.) Combined precipitation and acid consolidation of the two metals creates 7-15 nm particles consisting of a combination of two metals and 3.) nanosintering occurs when additional metal crystallite seeds are added to the consolidated metal precipitated mixtures under discrete temperatures, pressure, ultrasound frequency, and magnetic fields to produce nanoparticle metal composites 10-60 nm in size.

Once nanosintered, preferably the nanoparticles have a size or diameter of about 10-60 nm. While the methods themselves produce a high purity of such nanoparticles filtration of the densely packed nanoparticles can confirm and optionally select for the desired size. In preferred embodiments, in the process of consolidating nanoparticles prior to nanosintering of the nanoparticles as well as afterward, it is beneficial to stabilize the particles by applying active surface agents (surfactants, ligands, small polar molecules, polymers), preferably acid surface agents such as carbon-based molecules rich in carbonic acids and/or hydroxyl moieties. Among these include C5-12 and C17-C24 multi-hydroxy multi carbonic acids. Preferably, for aqueous citrate ion ligands (1-100 mg/ml) provide electrostatic repulsion for stabilization and for non-aqueous fatty acids such as oleic acid (0.1-100 mM) provide steric repulsion for stabilization. In some cases the combination of electrostatic and steric stabilization is found, for example in the case of some polymers or dendrimers. In other cases the addition of multiple layers of surface agents may be required. In general, surface active reagents can be chemically anchored or physically adsorbed on the densely packed nanoparticles to form a repulsive force to balance the van der Waals attractive forces acting on the nanoparticles, thus stabilization in a suspension is achieved. Functional groups including but not limited to carboxylic acids, phosphates, sulfates, silanes, phosphonic acids, amines, etc. are suitable as surface active functionalities. Those skilled in the art of nanoparticle synthesis will appreciate that precious metals and other coatings can be deposited on densely packed nanoparticles through reactions in microemulsions, redox transmetalization, sol gel methods, and so on to create core-shell magnetic nanoparticles if desired post cross-crystallization. Au, Ag, Pt, Pd, $SiO_2$, and C are common shell materials for magnetic nanoparticles to introduce additional surface functionality.

It has also been found that the addition of a co-solvent can improve the properties of the magnetic fluid when using it in the application of inkjet printing. Preferably, the co-solvent includes polyethylene glycol (PEG). glycerine, ethylene glycol, a hydroxyl-(poly)ether, a hydroxyl-(poly)ketone, a hydroxyl-(poly)aldehyde or the like.

Adapting the nanoparticle fluid for a variety of different purposes, print nozzles or for variations that improve shelf life may also include the addition of UV curable monomers or oligomers, a photoinitiator, a biocide, a bonding agent, an anti-corrosion agent, a substrate conditioner, buffer reagents to control pH or the like as known in the inkjet arts. Additives may also be provided to enhance or alter the color of the magnetic fluid. Among these include a variety of colorants, pigments, dyes or a mixture thereof.

Example 1

Formation of Densely Packed Nanoparticles for Use in a Magnetizable Fluid

In this example, 1.) metal oxides of Me(III) and Me(II) are precipitated alone in part, followed by ii.) combined precipitation. The combined precipitates then undergo iii.) acid assisted consolidation followed by iv.) nanosintering. Afterwards, colorants and additives can be provided to the nanosintered oxide structures as desired to create a final nanoparticle fluid for desired applications.

Figure 2:
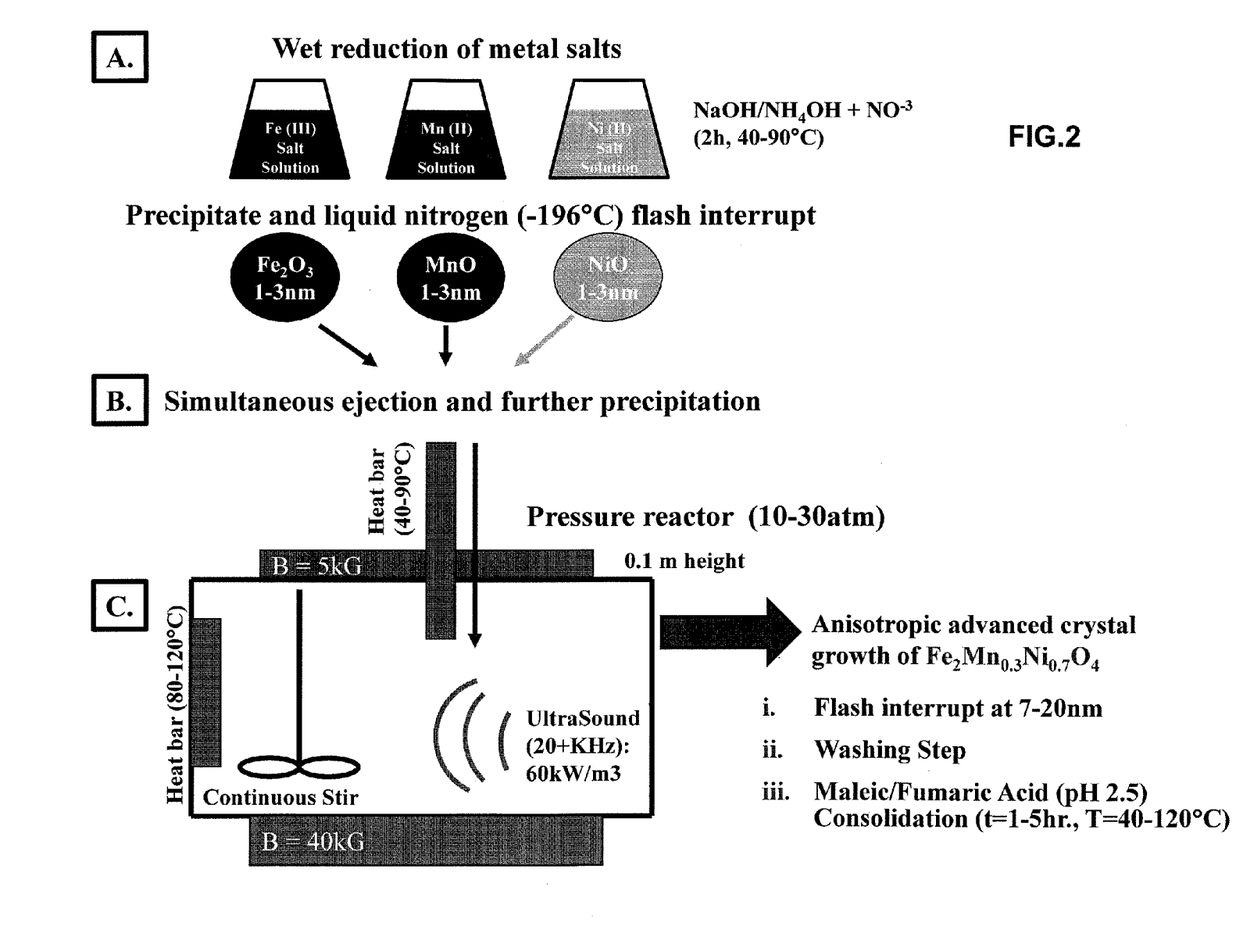
FIG. 2 is a schematic showing a process of combining two individual metal (i. Me(III), ii. Me(II)) hydroxide nanocrystalline precipitates (1-3 nm) to form larger precipitates of a third hydroxide solution of mixed metals (7-20 nm). A.) Individual metals are precipitated and growth and nucleation is flash interrupted by a cryogenic fluid (liquid nitrogen (LN)). B.) Precipitated solutions are simultaneously ejected down a heated rod into a pressure reactor chamber under distinct conditions. C.) Anisotropic advanced crystal growth of mixed metal precipitates occurs. The mixed metal precipitates are flash interrupted by LN, washed, and then exposed to an acid solution for acid assisted consolidation.

Materials and Methods. First, nano-crystallites of metals are prepared with a wet reduction method. A suspension of Me(III) and Me(II) salt solutions (i.e. Me(chlorides, sulfates, nitrates, etc.)) are each independently precipitated in an inert atmosphere using a base such as NaOH, increasing the pH of the system between 10-14, for 1-5 hours at elevated temperatures of 40-120 degrees C. to allow nucleation of very small nanocrystals that are 1-3 nm in diameter. Nucleation of nanocrystals is followed by flash interruption of growth by a cryogenic liquid, such as liquid nitrogen (LN), to form Me oxide particles of 1 nm to about 3 nm (FIG. 2 (a)) A third suspension of both Me(III) and Me(II) can also be precipitated under the same conditions.

The solutions are combined by ejecting them simultaneously toward a rod heated to 40-90 degree C. and precipitation continues as the fluids are collected in an autoclave with a pressure <100 MPa and temperature between 80-120 degree C. (FIG. 2 (b)). Ultrasonic frequencies of >20 KHz and a magnetic field magnetic field (H-field (Gauss)) created by placing two permanent magnets of 5 kG at the top and 40 kG at the bottom of the reaction chamber assist in anisotropic advanced growth of the nanoparticles (FIG. 2 (c)). The particles then undergo washing and acidic assisted consolidation in aqueous C5-10 and non-aqueous C16-24, about 1-100 mg/ml or (0-1M) concentration in appropriate medium, for 1-5 hrs at 40-120 degrees C. Acid consolidation is repeated multiple times in aqueous C5-10 and non aqueous C16-24. In preferred cases, during this step at least two carboxyl groups are dissociated and form a carboxylate complex with the Me atoms on the surface. The additive molecules, such as maleic acid or fumaric acid have a chemical moiety which is able to bind to the nanoparticle surface, control the particle growth and eventually yield to a preferred size. The growth is flash interrupted when the particles reach about 7-20 nm.

Figure 3:
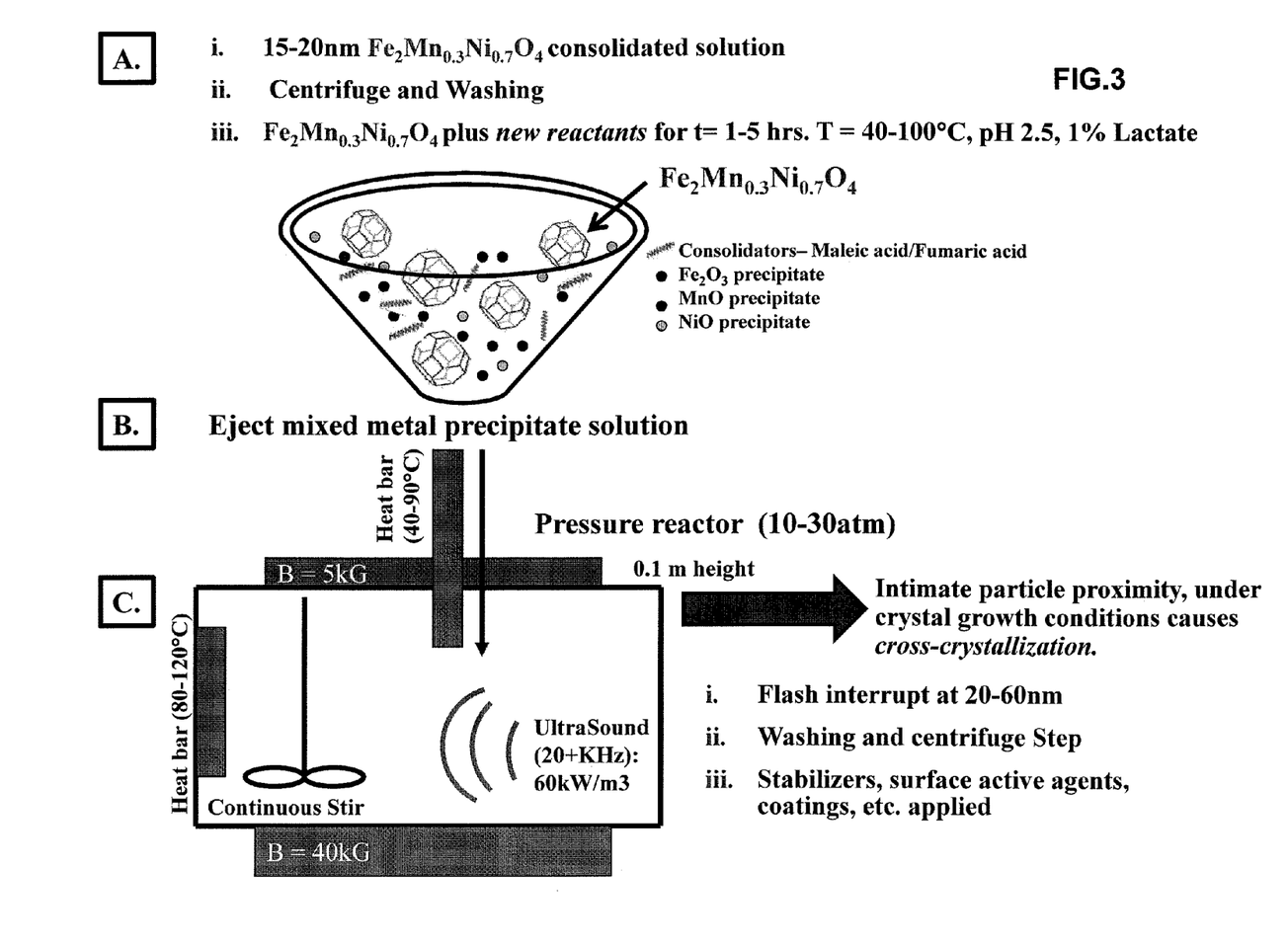
Figure 4:
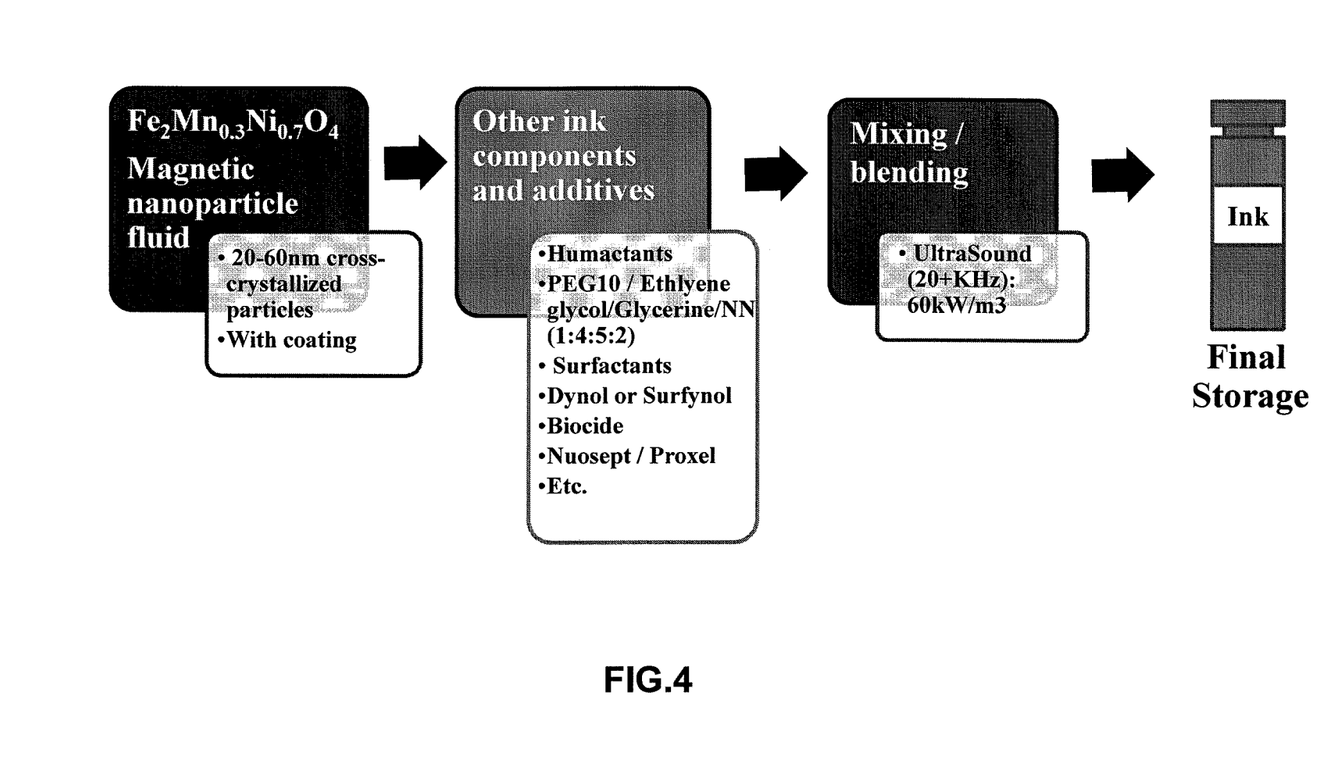
FIG. 4 provides a schematic depicting an exemplary final ink formulation. The fabricated nanoparticle fluid is combined with other components and additives to make a final ink formula ready for storage.

The consolidated metal nanoparticle precipitate solution is washed and further precipitation is allowed to occur with newly added reactants, which consists of metal precipitate solutions and acid consolidation solutions, by ejecting a mixture of various precipitates down a heated rod in the same way as described previously, as shown in FIG. 3(a-b). Next, particles are fused by cross-crystallization (nanosintering) in an autoclave (FIG. 3 (c)) under the same conditions as described previously in water, as an example of an aqueous solvent or particles can be cross-crystallized (nanosintered) in epoxy/oil as a non-aqueous solvent, etc.—Intimate particle proximity, with aid of acid consolidation, under crystal growth conditions causes cross-crystallization. The cross-crystallization process is flash interrupted by liquid nitrogen when the particles reach a diameter of 20-60 nm, The particles are washed and centrifuged and a final surface stabilizer or coating is applied to the nanoparticle surfaces. Finally, the magnetic nanoparticle fluid is combined with other ink components and additives and prepared for final storage as shown in FIG. 4. The natural pigmentation is a result of the cross-crystallization and colors of the final Me nanoparticle composite.

What is claimed is:

1. A fluid for ink jet printing magnetizable characters on a substrate that become magnetized in the presence of a magnetic field, the fluid comprising a suspension of nanoparticles dispersed in a solvent, wherein the fluid comprises a viscosity from 1 to 15 cp and a surface tension of 20-40 dynes, further wherein each nanoparticle is sized between 10-60 nm and is a composite of metal oxides that are magnetizable in the presence of a magnetic field, further wherein the composite of metal oxides is composed of
   a) $M(III)_2O_3$, $M(II)O$ and $M(II)M(III)_2O_4$, wherein M(III) is a trivalent metal and M(II) is a divalent metal, or
   b) $Fe_2O_3$, MnO and M(II)O, wherein M is a divalent metal selected from the group consisting of Fe, Ni, Mn, Co, Cu, Pt, Au, Ag, Ba and a rare earth metal.

2. The fluid according to claim 1, wherein the fluid further comprises C5-12 and C17-24 multi-hydroxy multi-carbonic acids and a co-solvent selected from the group consisting of polyethylene glycol (PEG), glycerine, ethylene glycol, a hydroxyl-(poly)ether, a hydroxyl-(poly)ketone, and a hydroxyl-(poly)aldehyde.

3. The fluid according to claim 2, wherein the distance between any two different neighboring metal oxides is 1 nm to 15 nm.

4. The fluid according to claim 1, wherein the solvent comprises at least 50% by volume an aqueous solvent or a non-aqueous solvent, the fluid further comprising at least one biocide or at least one substrate conditioner, a bonding agent and optionally a colorant, pigment, dye or pigment-dye hybrid.

5. The fluid according to claim 1, further comprising UV curable monomers or oligomers, a photoinitiator, a biocide and a substrate conditioner.

6. The fluid according to claim 1, wherein the fluid comprises a shelf life of at least 12 months by resisting separation by a magnetic field or gravitational force, wherein resisting separation comprises maintaining less than a 30% difference in density at both bottom and top regions of the fluid compared to the average density of the fluid.

7. A nano-particle sized from 10-60 nm, wherein the nano-particle is a composite of metal oxides that are magnetizable in the presence of a magnetic field, further wherein the composite of metal oxides is composed of
  a) $M(III)_2O_3$, $M(II)O$ and $M(II)M(III)_2O_4$, wherein $M(III)$ is a trivalent metal and $M(II)$ is a divalent metal, or
  b) $Fe_2O_3$, $MnO$ and $M(II)O$, wherein M is a divalent metal selected from the group consisting of Fe, Ni, Mn, Co, Cu, Pt, Au, Ag, Ba and a rare earth metal.

8. A substrate printed with the fluid according to claim 1.

9. The substrate according to claim 8, comprising print density of at least 5 μL/inch$^2$ and a black optical density of at least 90 as measured using the TAPPI METHOD OD 1213.

10. The substrate according to claim 8, wherein the substrate is a layered document and the fluid provides a security feature, wherein the fluid is deposited between at least two of layers of the document, wherein the at least two layers are opaque.

11. The substrate according to claim 10, wherein the document is selected from the group consisting of a certificate, currency, a check, a ticket and a stamp.

12. The substrate according to claim 8, wherein the fluid is covered with an opaque covering including a member selected from the group consisting of an ink, a dye, a pigment, a colored fluid, and an overcoat varnish.

13. The substrate according to claim 8, wherein the fluid is printed as a readable mark and in a configuration selected from the group consisting of a 1-dimensional barcode, a 2-dimensional bar code, a PDF417 barcode, a datamatrix barcode, a E13B format and a CMC7 format.

14. The substrate according to claim 8, wherein the fluid is printed as a magnetic ink character recognition (MICR) line on a check.

15. A method of providing a secure substrate, comprising:
  a) providing a substrate; and
  b) printing a security feature with the fluid according to claim 1 on the substrate by an inkjet printing process or an offset printing process.

16. The method according to claim 15, wherein the substrate is a document, a commercial good, packaging or a label.

17. The method according to claim 15, wherein the security feature is printed using the offset printing process.

18. The substrate according to claim 8, wherein the printing is covered with an opaque ink or an opaque nonmagnetic substrate.

* * * * *